(12) United States Patent
Heinz et al.

(10) Patent No.: US 10,130,108 B2
(45) Date of Patent: Nov. 20, 2018

(54) METHOD FOR ENHANCING THE PRODUCT QUALITY AND PRODUCT SAFETY OF MEAT OR FOODSTUFFS OF ANIMAL OR VEGETABLE ORIGIN

(71) Applicants: DEUTSCHES INSTITUT FÜR LEBENSMITTELTECHNIK E.V., Quakenbrück (DE); TRITON GMBH, Berlin (DE)

(72) Inventors: Volker Heinz, Quakenbrück (DE); Fritz Kortschack, Berlin (DE)

(73) Assignees: DEUTSCHES INSTITUT FÜR LEBENSMITTELTECHNIK E.V., Quakenbrück (DE); TRITON GMBH, Berlin (DE)

( * ) Notice: Subject to any disclaimer, the term of this patent is extended or adjusted under 35 U.S.C. 154(b) by 270 days.

(21) Appl. No.: 14/424,029

(22) PCT Filed: Aug. 8, 2013

(86) PCT No.: PCT/EP2013/066597
§ 371 (c)(1),
(2) Date: Feb. 25, 2015

(87) PCT Pub. No.: WO2014/037180
PCT Pub. Date: Mar. 13, 2014

(65) Prior Publication Data
US 2015/0296817 A1    Oct. 22, 2015

(30) Foreign Application Priority Data

Sep. 4, 2012  (DE) ................... 10 2012 108 204
Apr. 8, 2013  (DE) ................... 10 2013 006 050
May 6, 2013  (DE) ................... 10 2013 007 786
May 28, 2013 (DE) ................... 10 2013 009 032

(51) Int. Cl.
A23B 4/18      (2006.01)
A23B 4/033     (2006.01)
A23B 4/16      (2006.01)
A23L 3/015     (2006.01)
A23L 3/12      (2006.01)
A23L 3/3418    (2006.01)
A23L 3/3427    (2006.01)
A23L 3/3463    (2006.01)
A23L 3/36      (2006.01)
A23B 4/005     (2006.01)
A23B 4/01      (2006.01)
A23B 4/06      (2006.01)
A23B 4/22      (2006.01)
A22C 9/00      (2006.01)
A22C 7/00      (2006.01)

(52) U.S. Cl.
CPC .............. *A23B 4/18* (2013.01); *A22C 7/0023* (2013.01); *A22C 9/00* (2013.01); *A23B 4/0056* (2013.01); *A23B 4/012* (2013.01); *A23B 4/033* (2013.01); *A23B 4/06* (2013.01); *A23B 4/16* (2013.01); *A23B 4/22* (2013.01); *A23L 3/0155* (2013.01); *A23L 3/12* (2013.01); *A23L 3/3418* (2013.01); *A23L 3/3427* (2013.01); *A23L 3/34635* (2013.01); *A23L 3/362* (2013.01)

(58) Field of Classification Search
CPC . A22C 9/00; A22C 7/0023; A23L 3/12; A23L 3/3418; A23L 3/3427; A23L 3/34635; A23L 3/362; A23L 3/0155; A23B 4/18; A23B 4/0056; A23B 4/012; A23B 4/033; A23B 4/06; A23B 4/16; A23B 4/22
USPC .................................. 426/323, 410, 414, 541
See application file for complete search history.

(56) References Cited

U.S. PATENT DOCUMENTS 5,573,797 A  * 11/1996 Wilhoit ................ A23B 4/22
                                                     426/106
2008/0260916 A1* 10/2008 Kortschack .......... A23B 4/0056
                                                     426/105
2011/0014323 A1*  1/2011 Heinz ...................... A22C 7/00
                                                      426/59

FOREIGN PATENT DOCUMENTS

DE        10245603 A1     2/2004
DE     102005011868 A1    9/2006
(Continued)

OTHER PUBLICATIONS

WO2004019690A2 published Mar. 11, 2004, machine translation.*
(Continued)

*Primary Examiner* — Subbalakshmi Prakash
(74) *Attorney, Agent, or Firm* — Kinney & Lange, P.A.

(57) ABSTRACT

The invention relates to a method for enhancing the product quality and product safety of meat or foodstuffs of animal or vegetable origin by means of selective pressure and temperature treatment. According to the invention, fresh or warm meat of any form is packed in portions using a film container which has recoil abilities and therefore any liquid possibly escaping from the packed product distributes itself uniformly over the surface of the product. The packed portions are then placed in a container-like treatment device which has, mounted on the surfaces coming into contact with the product, a plurality of cushions, tubes or similarly elastic structures to which a pressure and temperature control medium may be applied. The cushions, tubes or similarly elastic structures are filled with the pressure and temperature control medium in such a manner that substantially uniform pressure forces act on the packed product and the packed product can be held in a predefined temperature range which is maintained for a predetermined period. On expiry of the predetermined period, the packed product is then rapidly cooled by exchanging the temperature control medium.

15 Claims, No Drawings

(56) References Cited

FOREIGN PATENT DOCUMENTS

| DE | 102008004242 | A1 | 6/2009 |
|---|---|---|---|
| WO | 2004019690 | A2 | 3/2004 |
| WO | 2006132922 | A2 | 12/2006 |
| WO | 0189308 | A2 | 11/2011 |

OTHER PUBLICATIONS

DE10245603A1 published Feb. 19, 2004, machine translation.*
English Translation of International Search Report dated Nov. 1, 2013 for PCT/EP2013/066597.

* cited by examiner

METHOD FOR ENHANCING THE PRODUCT QUALITY AND PRODUCT SAFETY OF MEAT OR FOODSTUFFS OF ANIMAL OR VEGETABLE ORIGIN

BACKGROUND

The invention relates to a method for enhancing the product quality and product safety of meat or foodstuffs of animal or vegetable origin by means of a selective pressure and temperature treatment.

As outlined, for instance, in Document DE 102 45 603 A1, the meat treatment aims at a maximum enjoyment of the meat along with a very long shelf life of the meat product. DE 102 45 603 A1 discloses, to this end, a maturation method for meat. Initially, the bodies of the slaughtered animals are deboned in a warm state, and the deboned bodies are then cut into portion units. The portion units are then packaged, followed by cooling under defined conditions. According to this invention the packaging of the portion units is accomplished by applying an external pressure, in particular liquid pressure, by means of a film or a membrane, namely such that the portion units are tightly enclosed, preferably without entrapped air. The cooling and/or, if required, refrigeration is carried out in a liquid bath and/or brine bath using a refrigerating fluid.

The introduced method is able to prevent, respectively, reduce the effect of the so-called cold-shortening, i.e. the low-temperature contraction, or a hot-shortening, i.e. the rigor contraction. Thus, it is possible to counteract the muscle shortening which may take place until the start of the rigor mortis.

In this regard, it is also possible to realize a mechanical influence by applying pressure to the product surface of the product to be treated.

Document DE 39 08 585 C2 accordingly describes an elastic wrapping for shaping meat to obtain an approximately round shape, the wrapping being formed as a packaging bag or packaging hose which forces the meat to adopt the aforementioned round shape. The preferably employed hose or bag is elastic with respect to its cross-section, and the hose material expands in a rubber-like manner by the application of an external force and automatically returns to its original state once the external force application stops. The elastic radial expansibility is about 50% of the hose circumference in cross-section, and a possible longitudinal extension is about 25%. By making use of the elastic wrapping, DE 39 08 585 C2 discloses a method for shaping meat by means of the wrapping, which is pulled over a tube and, upon pushing the meat there through, lies tightly around the meat so as to obtain the desired round shape. The corresponding hose or bag can then be closed by welding the wrapping surplus at the ends together. In one embodiment it is possible to withdraw air from the hose or bag after being filled with the meat, meaning a vacuuming may take place.

It is also known to apply tensile forces parallel to the fiber direction of the meat so as to reduce a muscle contraction. This method is used with suspended animal body halves stored in a cool place until the rigor mortis commences.

It has shown, however, that the methods briefly outlined above result in reproducible properties only in connection with certain products. In many cases, the desired quality level cannot be achieved. Outer packagings required in known technologies, but also the transport between or to different treatment apparatus result in a higher germ load, which cannot be entirely precluded and thus represents a problem to the product safety.

SUMMARY

Based on the foregoing it is therefore the object of the invention to provide an improved method for enhancing the product quality and product safety of meat or foodstuffs of animal or vegetable origin by using a selective pressure treatment and, at the same, temperature treatment. In particular, the method is also intended for use for those products that are shaped or grown irregularly, for example, also animals halves, animal quarters or smaller units, with or without bones, or those the original shape of which should be stabilized or maintained.

A solution to the object of the invention is achieved by a method for enhancing the product quality and product safety of meat or foodstuffs of animal or vegetable origin Embodiments of methods disclosed herein may be directed to the treatment of fresh meat, to the treatment of foodstuffs of animal or vegetable origin, and to the treatment of raw sausage of animal or vegetable origin.

The method for enhancing the product quality and product safety of meat or foodstuffs of animal or vegetable origin comprises the basic steps explained below.

Basically, it is possible to subject whole, halved, quartered, or also smaller parts of animal bodies, with and without bones, packaged or not packaged, to the combined temperature and pressure treatment according to the invention. A treatment of unpacked animal bodies is suited if the treated parts are subsequently subjected to a further cutting, while the combined pressure and temperature treatment is to achieve a higher degree of tenderness and quasi preserve the warm meat effect for raw materials for the production of sausage and meat products before.

To obtain storage packages, respectively, end consumer packages fresh or warm meat of any form is initially packaged in portions using a film container. The film container has restoring forces so that extremely small amounts of liquid escape from the packaged product, and these small amounts are distributed over the total surface of the product and are not concentrated or lead to a liquid accumulation at certain points.

A predetermined quantity of the packaged portions is then introduced into a container-like treatment apparatus, e.g. are stacked there.

On the surfaces coming into contact with the product to be treated the container-like treatment apparatus has, for instance, a plurality of cushions, hoses or similar elastic structures to which a pressure and temperature medium may be applied. Unpacked product can be protected against a possible contamination by a separating film to the contact surfaces.

Unlike cushions or hoses which are shapeless, the structures may alternatively also have a shaping property. These structures may be realized by rigid materials configured as molds with lids. In this case, it is possible to obtain a desired geometry even for fresh meat, with the meat being pressed and exposed to a temperature by temperature-controlled pressure means, whereby the thermal energy is transferred to the pressed meat for the purpose of cooling or heating.

If solid lower molds are used, these molds may comprise resiliently mounted individual dies or, in terms of surface area, many small dies, which adapt to the contour of the product to be treated, thus transferring the pressure. Peltier elements may be used additionally for heating or cooling purposes.

In the next step, a filling of the shaping, shape-supporting or shapeless structures with the pressure and temperature control medium is realized such that substantially uniform compressive forces act on the packaged product. Moreover, the product is kept in a predefined temperature range which, in a preferred embodiment, is between approximately 14° C. and 16° C.

The temperature control is realized by a predetermined time window, or a time window determined by the course of the pH-value, in particular until the muscular rigidity commences.

The temperature control of the warm meat can alternatively also be realized by a temperature-controlled airflow or water flow, whereby, according to the invention, the focus is on a quasi parallel temperature control and pressure treatment so as to obtain an optimum degree of tenderness for frying meat, respectively, cooking meat and maintain the warm meat property for meat to be processed of any sort of meat, such as beef, pork, mutton, turkey etc.

Upon the expiry of the predetermined/determined time window the packaged product is then rapidly cooled, namely in an inventive way by exchanging the temperature control medium. Providing an outer packaging or changing the position of the product to be treated in the container-like treatment apparatus is not necessary.

In a preferred embodiment of the invention it is possible to add an oxidation-inhibiting substance, respectively, a substance having an antimicrobial effect to the packaged product via the inner coating of the film container or to the product to be packaged. This substance can be, for instance, a rosemary extract.

In order to minimize the germ load the respective film container may have an antimicrobial coating or a corresponding surface.

Additionally, an addition of $CO_2$ or a $CO_2$ gassing is possible. This $CO_2$ addition limits the living conditions of undesired microorganisms, namely due to the fact that a treatment of this type results in an acid environment on the product surface. Either the $CO_2$ diffuses through the film container or is dissolved in the product liquid. Due to the advantageous restoring properties of the film container the film material adopts the shape of the product surface even after a $CO_2$ gassing process.

The co-occurrence of a $CO_2$ supply or $CO_2$ gassing and higher temperatures according to the desired treatment improves the effect of the oxidation-inhibiting additions.

During the treatment of warm meat the predetermined/determined time window for the temperature treatment is maintained until the muscular rigidity commences.

If the raw material obtained in accordance with the above description is processed further to sausage products and meat products the addition of hygroscopic substances, such as phosphate or milk protein, is not necessary as the warm meat effect is preserved beyond the point in time when the rigor mortis commences due to the pressure/temperature treatment.

For the production of sausage and meat products for which a defined shape is desired the cushions, hoses or similar elastic structures are provided with shaping surfaces on the side facing the product to be treated, which have a desired rigidity so as to transfer the product to be treated into a shape determined by the shaping surfaces.

The shaping surfaces may additionally be configured to have thermal energy act on the product to be treated. In particular, such an embodiment is envisaged that allows a generation of ohmic heat.

For the production of raw sausage the predetermined temperature range is adjusted, with respect to the temperature level and duration, to the drying and maturing process of the product.

The drying of the product to be treated can be realized by using adsorbent agents and, in this regard, the starting product may be provided in a gas-permeable film container or be unpacked.

The container-like treatment apparatus can be exposed to a vacuum so as to carry out or accelerate the drying process. To this end, the treatment apparatus may be coupled to a vacuum flask, or corresponding vacuum pumps may be connected.

In order to avoid drying marks or compression marks on the product to be treated the moisture is discharged in a controlled manner by applying pressure in an interval type manner.

In order to limit negative effects of evaporation cold during the drying process a thermal stabilization may be carried out by means of the cushions or hoses and the temperature control medium.

DETAILED DESCRIPTION

The invention will be explained in more detail below by means of exemplary embodiments.

If warm meat is treated, the warm meat is cut up in a warm state immediately after slaughtering. The portions can then be vacuum-packaged by using, in this respect, the film containers having material properties that result in restoring forces.

Small amounts of liquid possibly escaping from the product to be treated are distributed uniformly over the total product surface.

The addition of oxidation-inhibiting substances, in particular of rosemary extract, to the product to be packaged and additional antimicrobial substances, in particular silver ions on the inside of the packaging film, allows a reduction of the oxidation, respectively, germ load to be expected by the longer lasting higher temperature.

The film to be used in accordance with the invention permanently clings closely to the packed foodstuff. If antimicrobially equipped films are used in this respect an undesired growth of microorganisms may be clearly reduced, respectively, prevented. Due to the tight full-surface contact the foil used incidentally prevents the formation of undesired gas and moisture bubbles which interrupt the contact between the foil and the foodstuff.

A further addition of $CO^2$ limits the living conditions of microorganisms as an acid environment is created on the product surface.

As required, the treatment apparatus used is equipped in accordance with the properties of the products to be treated so as to accomplish a uniform action of pressure, respectively, the directed and controlled temperature action on the product to be treated. To this end, the sides of corresponding containers facing the product to be treated are provided with cushions, hoses, pockets or similar means made of a highly flexible film material. Also means for supplying and discharging the pressure medium as well as for the temperature control are provided.

It was possible to taste a meat product treated according to the inventive method four days after slaughtering. The tasting resulted in surprisingly positive evaluations.

According to a subject, a comparison specimen cooled in the conventionally suspended manner was inedible at the mentioned point in time.

In addition to frying meat and cooking meat, processing meat was subjected to the pressure and temperature treatment according to the invention. This meat, too, showed properties of meat salted in a warm state.

By introducing the pressure medium into the flexible film cushions or film hoses surrounding the meat same firmly cling to the product to be treated, regardless of the original shape of the meat, and a very uniformly acting pressure can then be built up.

If the product to be treated is warm meat, a pressure treatment lasting until the rigor mortis begins can prevent that the cross-section of the muscles changes on account of a muscle contraction and the meat becomes chewy.

Temperature-controlled pressure media can influence the temperature of the product to be treated. Especially warm meat can be kept in a predetermined temperature range, preferably between 14° C. and 16° C., in which the muscle contraction does not occur, or only to a minimum extent. Upon the beginning of the rigor mortis the warm pressure treatment medium is exchanged for a cooling medium so that the product to be treated can be cooled to the desired temperature very rapidly and effectively or, if required, refrigerated.

In this exemplary embodiment, the degree of tenderness of warm meat is positively influenced by a pressure-mechanical and simultaneous thermal treatment in the period prior to the commencement of the rigor mortis.

For the production of sausage products and meat products the observance of defined shapes is desirable, and even imperative under sales aspects. In this respect, it is appropriate and supportive if the side of the used cushions, hoses or similar means facing the product to be treated are equipped with rigid shaping surfaces, e.g. shaped portions, and/or conducting materials for applying ohmic heat which may have, for instance, the shape of half-shells, the shape of corrugated discs or another geometrical design.

The pressure to be applied to the cushions, hoses or similar structures allows a stabilization of the product to be treated, packaged in a film or casing, or also unpacked, in the correspondingly desired shape. In this embodiment, too, the selective temperature control of the pressure medium allows a combined application of pressure and temperature, respectively, cold.

Semi-finished products may be temperature-controlled, viz. cooked, inter alia by the aforementioned ohmic heating, but also by means of a heated temperature control medium in the cushions, hoses or similar structures, and have a solid bite after a combined treatment of this type. After the respective temperature control process it is possible, for instance, to cool the product to be treated by changing the temperature of the pressure medium.

A transport of the product to be treated to various processing sites common in known methods is not necessary. The danger of recontamination during the production process is extremely limited.

The method introduced herein is also suited for the production of boiled cured products, e.g. boiled ham.

In the raw sausage treatment, sausage meat not yet being compressed can be introduced into a pressing mold between two films where it is compressed by a die.

A pressing mold of this type may be provided with the cushions or hoses according to the invention which, in this respect, also assume the function of the pressure application.

Shaped portions possibly mounted on the side of these cushions or hoses that faces the product to be treated serve to shape the sausage meat or, at least temporarily, heat the product by a heated temperature control medium in the cushions, hoses or similar structures, or by ohmic heat.

After the unpacked raw material filled between the films or casings was compressed in the further developed pressing mold the temperature control required for the maturing process can be realized by the pressurized medium until the isoelectric point is reached by acidification of the product to be treated, as of which a further drying has to be carried out so as to obtain the $a_w$-value reduction necessary for the stabilization of the product.

The drying process can, in this case, be realized by the use of adsorbent agents.

The pressure reduction creates a spacing between the surfaces of the cushions or hoses and the product to be treated so as to allow a vacuum drying.

In this respect, it is useful to arrange the pressing mold in a container that can be subjected to a vacuum and is filled with dry adsorbent agents or communicates with adsorbent agents.

Upon a corresponding activation a rapid drying process is initiated. The drying process can be influenced by controlling the vacuum and temperature-controlling the product to be treated.

As the adsorbent agents used are strongly hygroscopic they selectively absorb water, and are thus predestinated for their use for drying foodstuffs.

Due to the rapid drying of the raw products a temperature reduction starting on the surface of the product to be treated can occur. For the biochemical processes in the product to be treated not to be disturbed by too strong a temperature reduction it is possible according to the invention to regularly increase the temperature during the drying phase. To this end, the film cushions or hoses are then filled with a correspondingly temperature-controlled pressure medium.

It is known that a so-called drying mark or compression mark may occur on the surface of the respective product to be treated after a strong drying process, which prevents a uniform further water discharge.

By placing the contact surfaces against the surface of the product to be treated in an interval type manner the water discharge is interrupted, and an equilibrium of the $a_w$-value may ensue inside the pressurized product to be treated. This process sequence is repeated, possibly at a dropping default temperature, until the maturing and drying process of the product is completed.

The transport of the water vapor from the surface of the product to be treated to the adsorbent agents in the adsorber can be optimized by the mechanical circulation of the gas present in the system at a forced flow through the adsorber.

In this case, it is possible to influence and regulate the drying rate of the product to be treated by the flow rate of the gas. The use of suitable pressing molds, flattened on the end faces, thus allows to reduce the cap losses involved by cuttable products.

The treatment method described in the exemplary embodiment is usable not only for raw sausage products, but also for raw cured products.

In order not to delay the drying process it is possible, in one embodiment of the invention, to cool the adsorbent agents used.

If the pressure media in the film cushions or film hoses or similar structures are in direct contact with cooling coils of the adsorber the waste heat of the adsorbent agents, buffered if applicable, may be used for heating the product to be treated, and the produced evaporation cold on the surface of the product to be treated, possibly buffered as well, may be used for cooling the adsorbent agents. A pressure medium cycle of this type can reduce the use of additional energies and increases the efficiency of a respective apparatus.

Upon reaching the isoelectric point, i.e. a high water discharge readiness of the product to be treated, it is ensured that the drying process is carried out in a manageable manner so as to avoid drying marks. Regardless of the possible interruptions of the drying process by the cushions or hoses briefly lying against the product surface it is possible to prevent the product to be treated from cooling down too much by radiant heat.

In this respect, the cushions or hoses can be flown through by temperature-controlled pressure media, and the distance to the product to be treated is selected such that moisture can be discharged and radiant heat can be supplied.

As the pressure medium passes through the cushions or hoses, the medium heated by the adsorbent agents is cooled and can be reused in the circulation process for cooling the adsorbent agents.

The aforementioned drying step may also be carried out under a high vacuum.

The means mentioned in the exemplary embodiments for building up pressure, for the temperature control and for drying may be combined with commercially available spindle cooking and maturing press systems, with the aid of ventilators, but also under a high vacuum, or vacuum tanks. The basic structure of commercially available presses may be maintained. The components according to the invention merely have to be added.

It has surprisingly shown that the addition of $CO_2$ supports the processing property of warm meat for the production of raw products and non-perishable products by a fast acidification and distinct coloration.

Another surprising result after the treatment of boiling meat in accordance with the inventive teaching was a higher degree of tenderness and a clearly noticeable higher juiciness.

In general, it was found that not only the degree of tenderness and the water binding capacity of fresh meat for retail selling is increased, but also of processing meat, namely due to the pressure and temperature treatment for limiting the shortening effect, which can be clearly observed on the finished products made from this raw material.

The invention claimed is:

1. A method for enhancing the product quality and product safety of meat or other foodstuffs of animal origin by a selective pressure treatment and, at the same time, temperature treatment according to the following steps:
    packaging fresh or warm meat or other foodstuffs of animal origin in portions using a film container which has restoring forces so that escape of liquid is reduced and liquid possibly still escaping from the film container is distributed over a surface of the film container, to form a packaged product;
    introducing the packaged product into a container-like treatment apparatus which comprises a plurality of shapeless structures comprising cushions or hoses to which a pressure and temperature control medium is applied, the cushions or hoses each having a wall with a first side that contacts the packaged product and a second side that is opposite the packaged product;
    filling the shapeless structures with the pressure and temperature control medium on the second side of the wall opposite the packaged product, such that substantially uniform compressive forces act on the packaged product, and the packaged product is kept in a pre-defined temperature range from approximately 14° C. to 16° C. during a predetermined time window, and
    upon expiry of the predetermined time window, cooling the packaged product rapidly by exchanging the temperature control medium.

2. The method of claim 1, wherein the packaging step includes adding oxidation-inhibiting substances to the fresh or warm meat or other foodstuffs of animal origin.

3. The method of claim 2, wherein the film container has an antimicrobial coating or surface.

4. The method of claim 1, wherein the packaging step includes an addition of $CO_2$ or a $CO_2$ gassing to the fresh or warm meat or other foodstuffs of animal origin.

5. The method of claim 1, wherein the packaging step comprises packaging warm meat, and the predetermined time window is maintained until muscular rigidity commences.

6. The method of claim 1, wherein no water-binding substances are added to the meat or other foodstuffs of animal origin.

7. The method of claim 1, wherein for production of meat products or other foodstuffs of animal origin for which a defined shape is desired, a plurality of shaping surfaces are provided on a side of the wall facing the product to be treated, which transfer the packaged product to be treated into a shape determined by the shaping surfaces.

8. The method of claim 7, wherein the shaping surfaces are configured to have thermal energy act on the packaged product.

9. The method of claim 1, wherein the meat is raw sausage.

10. The method of claim 9, further comprising a drying process with an adsorbent.

11. The method of claim 9 wherein the container-like treatment apparatus is exposed to a vacuum so as to carry out or accelerate the drying process.

12. The method of claim 9, wherein in order to avoid drying marks or compression marks, moisture is discharged in a controlled manner by applying pressure in an interval type manner.

13. The method of claim 9, wherein in order to limit negative effects of evaporation cold during the drying process a thermal stabilization is carried out by the structures and the temperature control medium.

14. The method of claim 1, wherein the meat is whole, halved, quartered, or smaller units of animal bodies, with or without bones, enveloped by a contact protection to protect them against possible contamination.

15. The method of claim 1, wherein the shapeless structures are configured to include elastic wrapping for receiving the packaged product and obtaining a desired geometry of the packaged product.

* * * * *